United States Patent [19]
Elsner et al.

[11] Patent Number: 5,872,169
[45] Date of Patent: Feb. 16, 1999

[54] MAGNESIUM PROCESS

[75] Inventors: Dagwin Elsner, Parkdale, Australia; Roger Rothon, Guilden Sutton, United Kingdom

[73] Assignee: Flamemag International GIE, Paris, France

[21] Appl. No.: 852,491

[22] Filed: May 7, 1997

Related U.S. Application Data

[63] Continuation-in-part of PCT/AU95/00804 Dec. 1, 1995 published as WO95/19935 Jul. 27, 1995.

[30] Foreign Application Priority Data

Dec. 2, 1994 [AU] Australia .................. PM 9852

[51] Int. Cl.$^6$ .................................................. C01F 5/14
[52] U.S. Cl. .................... 524/436; 423/635; 423/636; 423/640
[58] Field of Search .................... 423/635, 636, 423/640; 524/436

[56] References Cited

U.S. PATENT DOCUMENTS

| | | | |
|---|---|---|---|
| 4,145,404 | 3/1979 | Miyata | 423/635 |
| 4,698,379 | 10/1987 | Nakaya | 523/513 |
| 5,025,042 | 6/1991 | Yoshida | 523/216 |
| 5,143,965 | 9/1992 | Mertz | 524/436 |
| 5,461,101 | 10/1995 | Rothon | 524/436 |
| 5,474,602 | 12/1995 | Brown | 106/18.26 |

FOREIGN PATENT DOCUMENTS

| | | |
|---|---|---|
| 0214494 | 3/1987 | European Pat. Off. . |
| 0568488 | 11/1993 | European Pat. Off. . |
| 4089308 | 3/1992 | Japan . |
| 9519935 | 7/1995 | WIPO . |

OTHER PUBLICATIONS

Derwent Abstract of JP 04–089308 of Mar. 1992.
Derwent Abstract 8800660 of Eisler, J. of Oct. 1990.

*Primary Examiner*—Paul R. Michl
*Attorney, Agent, or Firm*—Ladas & Parry

[57] ABSTRACT

The present invention relates to a flame retardant quality magnesium hydroxide having a BET surface area of less than approximately 10 m$^2$ per gram (uncoated), an average particle size of approximately 0.5 to 10.0 micron, and less than approximately 0.5% of particles over 10 micron (average particle size measured by laserlight scattering method), and a substantial number of crystals which are generally ovoid in cross section. A process for producing a flame retardant quality magnesium hydroxide is also described.

32 Claims, 15 Drawing Sheets and thermoplastic resins into which it is incorporated do not
MAGNESIUM PROCESS This application is a continuation-in-part of copending application(s) International Application PCT/AU95/00804 filed on Dec. 1, 1995 and which designated the U.S.

The present invention relates to a flame retardant magnesium hydroxide and to a process for preparing same.

Magnesium hydroxide is a staple industrial chemical which is used in a wide variety of areas. Magnesium hydroxide finds particular application as a component in thermoplastic synthetic resins to impart flame retardancy. However, the incorporation into thermoplastic synthetic resins can adversely effect the physical properties of the resins, in particular impact strength and elongation at break.

It is known in the prior art that the elongation at break and other properties of such thermoplastic resins may be improved by utilising magnesium hydroxide which is characterised by specific strain, crystallite size and surface area characteristics ("the desired type"). Production of this type of magnesium hydroxide is, for example, described in United Kingdom Patent 1,514,081 to Kyowa Chemical Industry Co. Ltd. The process of preparing such a magnesium hydroxide product requires that a magnesium salt solution is treated with base, e.g. ammonium, in substoichiometric quantities at low temperatures (eg. less than 60° C.) to precipitate an ammonium salt. The basic salt is then recrystallised in its mother liquor under fairly severe conditions (eg. 145° C. to 200° C.). Whilst such a process is effective, the process is very inefficient and conversion rates of magnesium are low, eg. of the order of 50 to 70%. Low magnesium recovery may lead to poor process economics and may also affect the subsequent disposal of the resulting ammoniacal salt solutions. Moreover, the magnesium hydroxide formed by the process contains crystals that appear to be flat and hexagonal in shape.

An alternative process for preparing magnesium hydroxide has been disclosed in Czech Patent 275,256, 1990, to RIIC. The RIIC patent describes a process for preparing magnesium hydroxide wherein a solution containing magnesium and calcium nitrates is treated with an excess of ammonia (eg. of 1.2 to 2.5 the stoichiometric amount) to generate a precipitate. It appears that no basic salt is generated, and autoclave recrystallisation is conducted under more mild conditions (eg. 130° C. to 160° C. for 10 to 90 minutes). It is suggested that the ability to recrystallise under these conditions is due to the presence of calcium and ammonium nitrates and free ammonia. However, the magnesium hydroxide product formed is not of the desired type, and thermoplastic resins into which it is incorporated do not demonstrate a high elongation at break. The process also suffers from difficulties in purification, due to the large concentration of calcium present (eg. 5 to 100 g/l). Moreover, the by-product ammonium nitrate formed cannot be used (eg. as a fertiliser or explosive) without further purification to remove calcium.

SUMMARY OF THE INVENTION

It is accordingly an object of the present invention to overcome, or at least alleviate, one or more of the difficulties relating to the prior art.

Accordingly, in a first aspect of the present invention there is provided a flame retardant magnesium hydroxide having a BET specific surface area of less than approximately 10 $m^2$ per gram (uncoated), preferably less than approximately 6 $m^2$ per gram;

an average particle size of approximately 0.5 to 10.0 micron, preferably approximately 0.5 to 5.0 micron, and less than approximately 0.5% of particles over 10 micron (average particle size measured by laserlight scattering method); and a substantial number of crystals which are generally ovoid in cross section.

Surprisingly the magnesium hydroxide according to the present invention contains a substantial number of crystals having a novel shape that is generally ovoid in cross section.

In a preferred embodiment there is provided a flame retardant magnesium hydroxide containing a substantial number of crystals being generally ovoid in cross section with a low BET specific surface area less than approximately 10 $m^2$/g, a median particle size of approximately 0.5 to 10.0 micron and an oil absorption less than approximately 70 mL/100 g, preferably less than approximately 60 mL/100 g, most preferably less than approximately 50 mL/100 g (oil absorption measured under International Standard ISO 787/5-1980(E)).

In a further preferred aspect of the present invention, the magnesium hydroxide may be coated with a surface active agent, preferably an anionic surfactant. A fatty acid surface active agent is preferred.

The anionic surface active agent may be selected from the group consisting of stearic acid, oleic acid, lauric acid, palmitic acid, sodium stearate, potassium behenate, sodium montanate, potassium stearate, sodium oleate, potassium oleate, sodium palmitate, potassium palmitate, sodium laurate, potassium laurate, sodium dilauryl benzenesulfonate, potassium octadecylfsulfate, sodium laurylsulfonate, disodium 2-sulfoethyl α-sulfostearate and ammonium salts of fatty acids, for example ammonium stearate. These anionic surfactants may be used either alone or as mixtures of two or more.

Ammonium stearate and sodium stearate are particularly preferred coating agents.

The magnesium hydroxide product may be incorporated into a polymeric composition in order to minimise the loss of useful properties including tensile elongation and tensile strength. Accordingly in a further preferred aspect there is provided a polymeric composition including a thermoplastic polymer, thermoset or elastomer; and a magnesium hydroxide component containing a substantial number of crystals being generally ovoid in cross section with a low BET specific surface area less than 10 $m^2$/g, a median particle size of approximately 0.5 to 10.0 micron and preferably an oil absorption less than approximately 70 mL/100 g (oil absorption measured under International Standard ISO 787/5-1980(E)).

The thermoplastic polymer may be a thermoplastic synthetic resin. The thermoplastic synthetic resin may be selected from the group consisting of homo- or co-polymers of styrene, homo- or co-polymers of propylene, homo- or co-polymers of olefins including ethylene, vinyl resins, polyester resins, polycarbonate resins, nylon resins, acetate resins, acetal resins and blends thereof. A homeo- or co-polymer of polypropylene or co-polymer of ethylene, such as ethylene vinyl acetate (EVA) is preferred.

The thermoset may be selected from, for example, unsaturated polyester resins, epoxy resins, acrylic resins and blends thereof.

The elastomer may be selected from, for example, styrene-butadiene rubber (SBR), ethylene-propylene (EP), ethylene-propylene diene monomer (EPDM) and blends thereof.

Various conventional additives may further be incorporated in the polymeric compositions in accordance with this invention.

Examples of these additives are coloring agents (organic and inorganic pigments) such as isoindolinone, cobalt aluminate, carbon black, or cadmium sulfide; other fillers such as calcium carbonate, alumina, zinc oxide or talc; anti-oxidants such as 2,6-di-t-butyl-4-methylphenol, 2,2'-methylenebis (4-methyl-6-t-butylphenol), dilauryl thiodipropionate or tridecyl phosphite; ultraviolet absorbers such as 2-hydroxy-4-methoxy benzophenone, 2(2'-hydroxy-5-methylphenyl)benzotriazole, 2-ethylhexyl-2-cyano-3,3-diphenyl acrylate, phenyl salicylate or nickelbisoctyl phenyl sulfide; plasticizers such as di-2-ethyl hexyl phthalate, di-n-butyl phthalate, butyl stearate, or epoxidized soybean oil; and lubricants such as zinc stearate, calcium, aluminium and other metal soaps, or polyethylene wax.

The polymeric composition may be provided in the form of polymeric articles, for example melt-shaped articles.

The magnesium hydroxide component may be a coated magnesium hydroxide. In this embodiment, a thermoplastic EVA product may exhibit a high elongation at break, eg. of greater than approximately 200%, preferably greater than approximately 500% and a high limiting oxygen index, eg. of greater than approximately 35% v/v, preferably greater than approximately 40% v/v.

The polymeric articles may take the form of cable sheathing or insulation materials.

In a preferred aspect of the present invention there is provided a process for preparing a flame retardant quality magnesium hydroxide which includes providing a magnesium chloride solution; and a source of ammonia;

adding a stoichiometric excess of ammonia to the solution to form a magnesium hydroxide precipitate; and subjecting the magnesium hydroxide to a hydrothermal recrystallisation.

It has been found that by utilising inter alia the process described above a magnesium hydroxide product with a high elongation at break may be produced in high yield, eg. approximately 80% or greater (based on magnesium). The magnesium hydroxide product may in turn be of flame retardant quality.

Surprisingly, applicant has found that the magnesium hydroxide produced according to inter alia the process of the present invention contains a substantial number of crystals having a novel shape that is generally ovoid in cross section.

The magnesium chloride solution preferably contains from approximately 20–130 g/l Mg, more preferably from approximately 30–120 g/l Mg, most preferably approximately 40 to 100 g/l Mg.

In a further aspect of the present invention the process may include the preliminary step of providing a magnesium-containing material; and a source of inorganic acid; and treating the magnesium-containing material with the acid to form magnesium chloride.

The inorganic acid is preferably hydrochloric acid. The hydrochloric acid may be provided in the form of an aqueous solution of approximately 20 to 35% by weight hydrochloric acid.

The magnesium-containing material may be of any suitable type. The magnesium-containing material may be a magnesium-containing ore. A magnesite or dolomite ore may be used. A magnesite-feed material such as macrocrystalline magnesite ore or cryptocrystalline magnesite ore may be used. By-product magnesium-containing materials may be used. By-product materials, containing $Mg(OH)_2$ and/or MgO for example, may be used. A magnesite ore or magnesium oxide derived from magnesite ore is preferred.

Where the starting material contains MgO, it may be leached with ammonium chloride as an alternative to the acid leach referred to above.

Accordingly, in a alternative preferred aspect of the present invention the process may include the preliminary step of providing a magnesium oxide-containing material; and ammonium chloride; and leaching the magnesium oxide-containing material with the ammonium chloride to form magnesium chloride.

The leaching step may be conducted at elevated temperature, e.g. from approximately 60° C. to 120° C., preferably from approximately 80° C. to 100° C. The leaching step may optionally be assisted by the injection of steam.

Ammonia generated during the leaching step may be utilised to form the ammonium hydroxide utilised in the later precipitation. For example the ammonia may be mixed with water in a suitable absorption device to form ammonium hydroxide.

Thus, the ammonium chloride by-product formed according to this aspect of the present invention may be recycled.

Accordingly, in a preferred aspect of the present invention, the process may further include the subsequent step of recycling at least a portion of the ammonium chloride so formed to the leach step.

Alternatively or in addition, the ammonium chloride formed as a by-product may be utilised industrially, eg. as a fertilizer ingredient.

The leachate from the leaching process may be subjected to a purification step prior to further processing.

Accordingly in a preferred aspect the process according to the present invention further includes subjecting the leachate to a filtration step to remove residue.

In the process of the present invention, a starting solution low in detrimental impurities is particularly preferred. Whilst applicant does not wish to be restricted by theory, it is postulated that magnesite or MgO derived from magnesite is particularly useful in making such a solution as it is low in detrimental impurities and the resulting solution is readily purified. Magnesium oxide is preferred to magnesite as the calcination step involved in its production may remove organic matter which may inhibit the reaction and also adversely affect product colour.

Accordingly, in a preferred aspect of the present invention, the magnesium chloride solution has a low organic content, a low transition element content and/or is low in sulphur and/or boron compounds.

Where the magnesium-containing material is a magnesite, the magnesite-feed material may be calcined in any known manner. The magnesite-feed material may be heated at temperatures above approximately 650° C., preferably in the range of approximately 800° to 1000° C. under calcining conditions. The heating may continue for approximately 1 to 8 hours, preferably approximately 3 to 5 hours.

The magnesium-containing material may be subjected to suitable crushing and/or grinding steps prior to salt solution formation.

The magnesium chloride solution so formed may be buffered to an approximately neutral pH value before further processing including purification as discussed below.

In a preferred aspect of the present invention a relatively pure magnesium chloride solution is used. By the term "relatively pure" as used herein we mean that trace impurities in the solution are at a level such that they do not substantially interfere with the process. Preferably, the relatively pure magnesium chloride solution contains less than approximately 100 ppm, more preferably less than approximately 10 ppm, and most preferably less than approximately 1 ppm transitional element impurities. The transitional element impurities may be metal impurities. In a particularly preferred form, the magnesium chloride solution contains less than approximately 50 ppm, more preferably less than approximately 10 ppm, most preferably less than approximately 1 ppm Cu, Ni, Fe or Mn. Alternatively or in addition the relatively pure magnesium chloride solution preferably contains less than approximately 1000 ppm, more preferably less than approximately 500 ppm, most preferably less then 100 ppm sulphur impurities. Alternatively or in addition the relatively pure magnesium chloride solution preferably contains less than approximately 200 ppm, more preferably less than approximately 100 ppm, most preferably less than approximately 50 ppm boron impurities. Applicant has found that the level of Ca impurities does not substantially affect the efficiency of the process.

Depending on the starting material used, it is preferred in certain circumstances to subject the magnesium chloride solution to a purification step to remove trace impurities. The trace impurities may be transition element impurities. The transition element impurities may be metal impurities, for example Fe, Ni, Cu and/or Mn.

Accordingly, in a preferred aspect, the process of the present invention includes a preliminary purification step which includes providing a magnesium chloride solution;

a source of base; and a source of oxidant;

adding the source of base to the magnesium chloride solution to raise the pH thereof;

treating the magnesium chloride solution with the source of oxidant to oxidise trace impurities therein; and removing trace impurities as their insoluble hydroxides.

The source of base may be of any suitable type which will raise the pH of the magnesium salt solution. For example, ammonium hydroxide ($NH_4OH$) and magnesium oxide (MgO) have been found to be suitable. Caustic magnesium oxide is preferred.

Preferably, the pH of the magnesium salt solution is raised to approximately pH 4–7, more preferably approximately pH 5–6.

The source of oxidant may be of any suitable type. For example hydrogen peroxide ($H_2O_2$) or chlorine ($Cl_2$) may be used. Chlorine gas ($Cl_2$) is preferred.

The trace impurities may be removed as their insoluble hydroxides by filtration. An ion exchange process may alternatively be used.

In the precipitation step according to the present invention, the purified magnesium chloride solution is then treated with a stoichiometric excess of ammonia. The ammonia may be provided in the form of ammonium hydroxide.

The amount of ammonia used may be such that the ammonia is present in the range of approximately 100 to 250% of the stoichiometric amount, preferably 150 to 250%, more preferably approximately 175 to 200% of the stoichiometric amount.

It is preferred to conduct the precipitation step at a temperature of approximately 15° C. to approximately 150° C., more preferably 30° C. to 110° C., most preferably approximately 40° C. to 90° C.

The ammonia addition time is preferably from approximately 2 seconds to approximately 2 hours, more preferably from approximately 1 minute to approximately 30 minutes, most preferably from approximately 2 minutes to 24 minutes.

Alternatively, the precipitation step may be continuous and ammonia is added continuously.

The hydrothermal recrystallisation step may be conducted at temperatures of approximately 130° C. to 300° C. or higher. The hydrothermal recrystallisation step is typically conducted in an autoclave which may be operated batchwise or continuously. In this case the hydrothermal recrystallization is preferably conducted at temperatures of approximately 150° C. to approximately 220° C., more preferably approximately 185° C. to approximately 210° C. A tube reactor may also be used as a form of continuous autoclave. In this case the hydrothermal recrystallisation is preferably conducted at approximately 150° C. to approximately 300° C., more preferably approximately 220° C. to 300° C. The hydrothermal recrystallisation may continue from approximately 6 hours to approximately 30 seconds, preferably approximately 2 hours to approximately 5 minutes, depending on the temperature selected.

The magnesium hydroxide product so formed may be subjected to a purification step. The magnesium hydroxide product may be filtered and the cake washed with water to produce a purified magnesium hydroxide product.

In a preferred aspect of the present invention the process for preparing a purified hydroxide magnesium product may further include subjecting the purified $Mg(OH)_2$ product to a drying step.

The drying step may be conducted utilising conventional techniques.

The drying may be conducted utilising a band dryer, pneumatic dryer, fluid bed dryer, spray dryer or the like or a combination thereof.

The $Mg(OH)_2$ product may be subjected to a calcining step to produce an MgO product. Calcining conditions may be similar to those used for magnesite treatment as discussed above.

In a further aspect of the present invention there is provided a flame retardant quality magnesium hydroxide whenever prepared according to the process as described above.

The present invention will now be more fully described with reference to the accompanying examples. It should be understood, however, that the description following is illustrative only and should not be taken in any way as a restriction on the generality of the invention described above.

EXAMPLE 1

Figure 1:
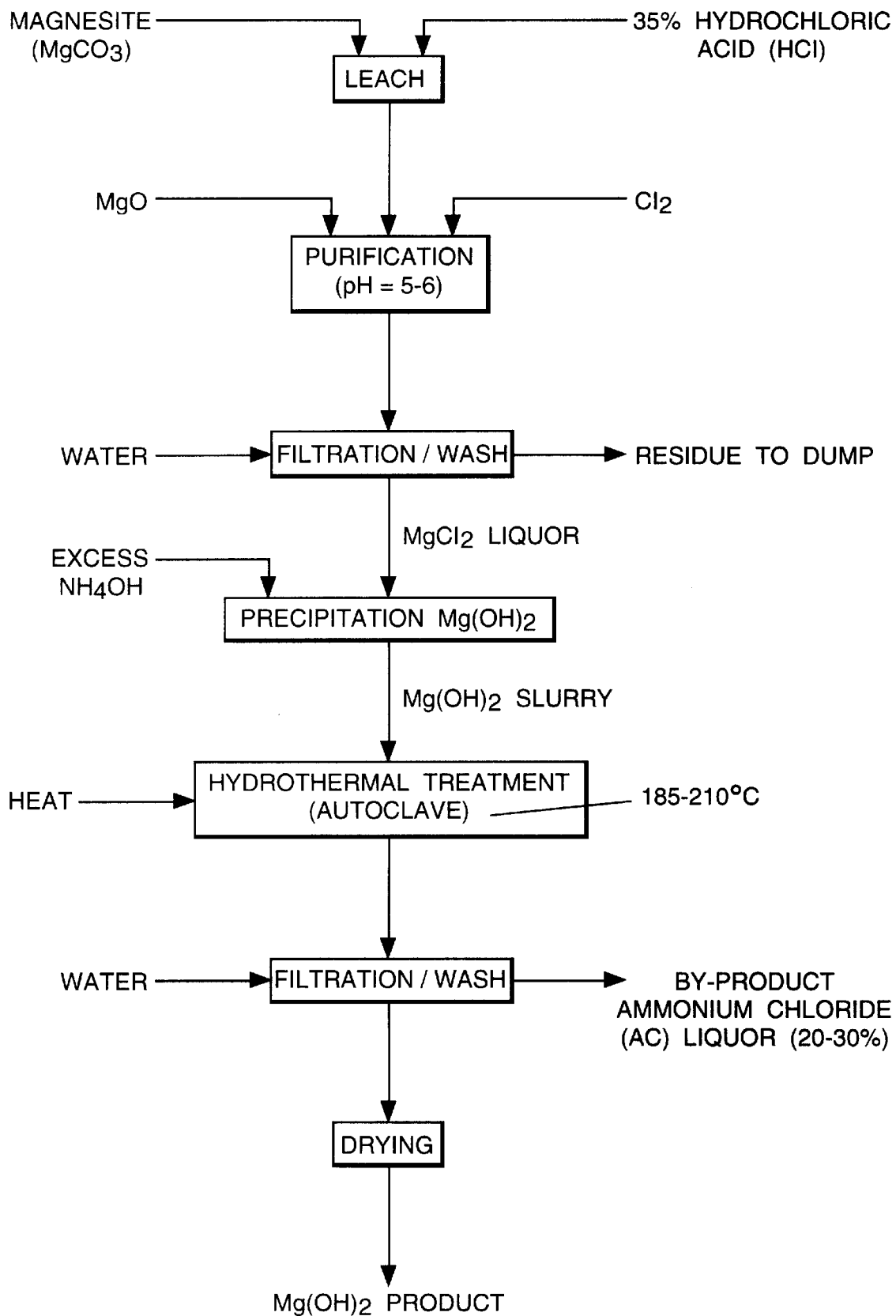
FIG. 1 is a flow diagram illustrating a preferred form of one aspect of the process of the present invention.
Figure 2:
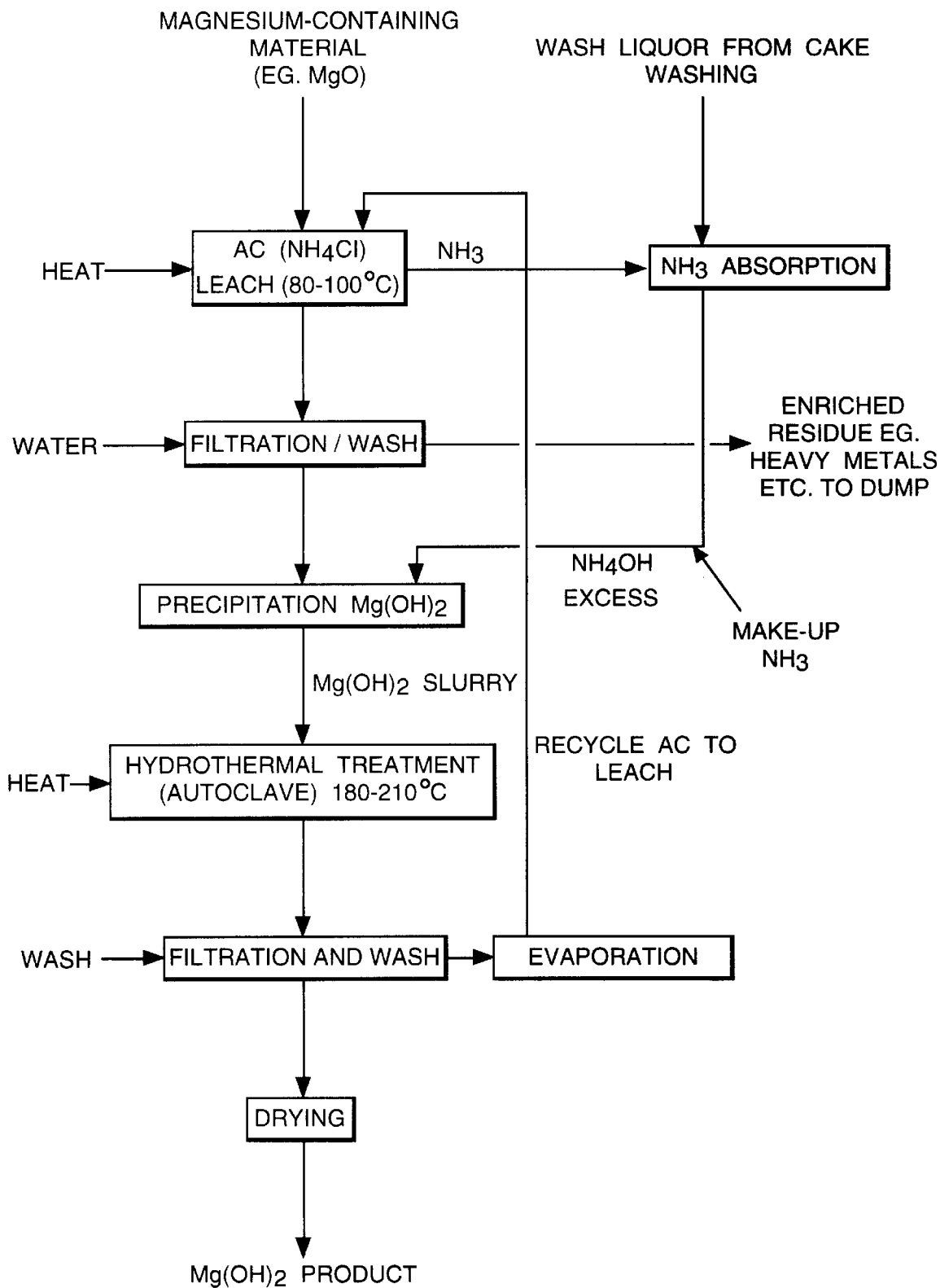
FIG. 2 is a flow diagram illustrating a preferred form of a further aspect of the process of the present invention.

Magnesium hydroxide was precipitated from a purified chloride solution obtained by HCl leaching of Kunwarara magnesite. Transition metal impurities Fe, Mn, Ni and Cu were removed from the leach solution by oxidation/neutralisation using chlorine gas as oxidant and caustic MgO as neutralising reagent. The purified liquor contained 107 g/L Mg, 2.8 g/L Ca and less than 1 mg/L each of Fe, Mn, Ni, Cu. The magnesium hydroxide precipitation was carried out batchwise in an unbaffled 5 liter glass beaker. Agitation was by 6-blade turbine driven by an overhead stirrer motor. The temperature was controlled with a hotplate. The operating conditions were as follows:

concentration of $NH_4OH$: 25% w/w $NH_4OH$ addition: 1.8×stoichiometric time of $NH_4OH$ addition: 19 minutes precipitation temperature: 30° C.

The slurry from the precipitation was hydrothermally treated in an autoclave at 185° C. for 2 hours. Autoclaved magnesium hydroxide was filtered, washed and then dried at 110° C. for 12 hours. The dry powder had the following characteristics:

BET specific surface area: 3.5 $m^2/g$ oil absorption (linseed oil): 50 mL/100 g

EXAMPLES 2–7

Magnesium hydroxide was obtained in the same manner as in Example 1 but for the conditions given in Table 1.

TABLE 1

Conditions and results - Examples 2–7

| Example No. | Temp. (°C.) | Stoichiometric ratio $NH_4OH/Mg$ | $NH_4OH$ addition time | Autoclave temperature (°C.) | Autoclave residence (h) | BET specific Surface area ($m^2/g$) | Oil absorption (linseed oil) (mL/100 g) |
|---|---|---|---|---|---|---|---|
| 2 | 80 | 1.8 | 19 minutes | 185 | 2 | 3.2 | 48.8 |
| 3 | 30 | 1.8 | 10 seconds | 185 | 2 | 2.9 | 44.7 |
| 4 | 30 | 1.8 | 60 minutes | 185 | 2 | 3.5 | 49.3 |
| 5 | 30 | 1.8 | 19 minutes | 210 | 0.25 | 4.8 | 46.5 |
| 6 | 30 | 1.8 | 19 minutes | 210 | 2 | 1.9 | 36.9 |
| 7 | 30 | 1 | 19 minutes | 185 | 2 | 2.8 | 48.2 |

EXAMPLE 8

Magnesium hydroxide was precipitated from a purified magnesium chloride solution obtained by leaching of Kunwarara magnesite with dilute HCl. The leach liquor was purified as described in Example 1. The purified solution contained 50.2 g/L Mg, 1.4 g/L Ca and less than 1 mg/L each of Fe, Mn, Ni, Cu. The magnesium hydroxide precipitation was carried out in an unbaffled 5 liter glass vessel. Agitation was by 6-blade turbine driven by an overhead stirrer motor. The temperature was controlled with a hotplate. The operating conditions were as follows:

concentration of $NH_4OH$: 30% w/w $NH_4OH$ addition: 1.8×stoichiometric time of $NH_4OH$ addition: 19 minutes precipitation temperature: 30° C.

The slurry from the precipitation was hydrothermally treated in an autoclave at 185° C. for 2 hours. The autoclaved product was filtered, washed and then dried at 110° C. for 12 hours. The dry powder had the following characteristics:

BET specific surface area: 1.9 $m^2/g$ oil absorption (linseed oil): 43.6 mL/100 g

EXAMPLE 9

Magnesium hydroxide was precipitated from a purified chloride liquor obtained by HCl leaching of caustic magnesia containing 94.16% MgO, 1.4% CaO, 1.88% $SiO_2$, 0.77% $Fe_2O_3$, 0.22% $Al_2O_3$ and 0.12% $SO_3$. The leach liquor was purified as described in Example 1. The purified solution contained 121.7 g/L Mg, 7.4 g/L Ca and less than 1 mg/L each of Fe, Mn, Ni, Cu. The precipitation of magnesium hydroxide and the subsequent hydrothermal treatment of the precipitate slurry was performed as described in Example 8. The autoclave product was filtered, washed and then dried at 110° C. for 12 hours. The dry powder had the following physical properties::

BET specific surface area: 3 $m^2/g$ oil absorption (linseed oil): 48.3 mL/100 g

EXAMPLE 10

Magnesium hydroxide was precipitated from a liquor obtained by leaching caustic MgO with an ammonium chloride (AC) recycle solution containing 20.7% w/w ammonium chloride, 3% w/w $MgCl_2$ and 1.5% w/w $CaCl_2$. The AC leach liquor contained 54.1 g/L Mg, 10.1 g/L Ca, <1 mg/L Fe and Mn, 3.1 mg/L Ni, 3.5 mg/L Cu. This solution was processed without further purification as described in Example 1. The dry autoclave product had the following physical properties.

BET specific surface area: 1.6 $m^2/g$ oil absorption (linseed oil): 39.7 mL/100 g

EXAMPLE 11

Magnesium hydroxide was precipitated from a liquor obtained by leaching caustic MgO with an ammonium chloride (AC) recycle solution containing 18.3% w/w AC, 3% w/w $MgCl_2$ and 1.5% w/w $CaCl_2$. The AC leach liquor contained 57.8 g/L Mg, 7.9 g/L Ca, <1 mg/L Fe and Mn, 4.8 mg/L Ni, 4.1 mg/L Cu. This solution was processed without further purification as described in Example 1. The product from the autoclave was filtered and washed. The wet filter cake was then reslurried in deionised water to a strength of 10% solids. The slurry was heated to 60° C. 2.5% w/w (magnesium hydroxide) of stearic acid and the stoichiometric amount of $NH_4OH$ (30 w/w) were added. The slurry was left agitated at 60° C. for ½ hour. The stearate coated material was then filtered and dried at 110° C. for 12 hours. The dry coated powder had the following physical characteristics:

BET specific surface area: 0.9 $m^2/g$ median particle size: 3.94 μm (15 minutes ultrasonics)

oil absorption (linseed oil): 42.5 mL/100 g

The stearate coated magnesium hydroxide was compounded in a two-roll mill compounder with ethylene vinyl acetate (EVA) 1020VN5 grade at a loading of 60% w/w. The physical properties determined on samples cut from compression moulded sheets of the compound were as follows:

tensile strength: 8.6 MPa elongation at break: 681% oxygen index: >40% v/v

EXAMPLE 12

Magnesium hydroxide was precipitated from a liquor obtained by leaching caustic MgO with the composition given in Example 9 with an ammonium chloride (AC) recycle solution containing 21.9% w/w AC, 1.5% w/w $MgCl_2$ and 2.1% w/w $CaCl_2$. The AC leach liquor contained 37.5 g/L Mg, 5 g/L Ca, <1 mg/L Fe, Mn and Ni, 1.1 mg/L Cu. This solution was processed without further purification as described in Example 1. Wet, washed product from the autoclave was coated with 2.5% w/w ammonium stearate in the same manner as in Example 11. The stearate coated material was then filtered and dried at 110° C. for 12 hours. The dry coated powder had the following physical characteristics:

BET specific surface area: 1.4 $m^2/g$ median particle size: 2.75 μm (15 minutes ultrasonics)

oil absorption (linseed oil): 33.9 mL/100 g

The stearate coated magnesium hydroxide was compounded with EVA as described in Example 11. The physical properties determined on samples cut from compression moulded sheets of the compound were as follows:

tensile strength: 7.8 MPa elongation at break: 675% oxygen index: >40% v/v

EXAMPLE 13

Magnesium hydroxide was precipitated from a purified chloride solution obtained by leaching of Kunwarara magnesite with dilute HCl. The purified liquor contained 76.8 g/L Mg, 1.7 g/L Ca, less than 1 mg/L each of Fe, Mn, Ni, Cu. This solution was processed as described in Example 1. Wet, washed autoclave product was coated with 2.5% w/w ammonium stearate in the same manner as in Example 11. The coated material was filtered and dried at 110° C. for 12 hours. The dry coated product had the following physical characteristics:

BET specific surface area: 2.6 $m^2/g$ median particle size: 1.47 μm (15 minutes ultrasonics)

oil absorption (linseed oil): 42.8 mL/100 g

The stearate coated product was compounded with EVA as described in Example 11. The physical properties determined on samples cut from compression moulded sheets of the compound were as follows:

tensile strength: 8.5 MPa elongation at break: 711% oxygen index: >40% v/v

EXAMPLE 14

Magnesium hydroxide was precipitated from a liquor obtained by leaching caustic MgO with an ammonium chloride (AC) recycle solution containing 11.8% w/w AC, 9.5% w/w $MgCl_2$ and 1.9% w/w $CaCl_2$. The AC leach liquor contained 50.8 g/L Mg, 10.5 g/L Ca, <1 mg/L Fe and Mn, 2 mg/L Ni, 2.5 mg/L Cu. This solution was processed without further purification as described in Example 1 except that the precipitation temperature was 60° C. Wet, washed product from the autoclave was coated with 2.5% w/w/ ammonium stearate in the same manner as in Example 11. The stearate coated product was filtered and dried at 110° C. for 12 hours. The dry coated powder had the following physical characteristics:

BET specific surface area: 2.7 $m^2/g$ median particle size: 1.99 μm (15 minutes ultrasonics)

oil absorption (linseed oil): 41.9 mL/100 g

The stearate coated magnesium hydroxide was compounded with EVA as described in Example 11. The physical properties determined on samples cut from compression moulded sheets of the compound were as follows:

tensile strength: 7.3 MPa elongation at break: 553% oxygen index: >40% v/v

EXAMPLE 15

Magnesium hydroxide was precipitated from a magnesium chloride solution containing 115.5 g/L Mg according to the conditions presented in Example 1. The slurry from the precipitation was hydrothermally treated in an autoclave at 150° C. for 0.25 and 2 hours. The products from the autoclave were filtered, washed and dried at 110° C. for 12 hours. The dry powders had the following characteristics:

| autoclave residence (h) | BET specific surface area ($m^2/g$) | oil absorption (mL/100 g) |
| --- | --- | --- |
| 0.25 | 7.6 | 70 |
| 2 | 5.0 | 65.9 |

The ovoid magnesium hydroxide crystals produced are shown in FIGS. 4(a) to 4(d) (0.25h) and FIGS. 5(a) to 5(d) (2h).

EXAMPLE 16

Magnesium hydroxide was precipitated from a chloride solution containing 81.5 g/L Mg, 0.05 g/L Ca, 1.7 mg/L Ni and <1 mg/L Fe, Mn. The precipitation was carried out batchwise in a 5 liter baffled SS vessel. Agitation was by 6-blade turbine driven by an overhead stirrer motor. The temperature was controlled by hotplate. The operating conditions were as follows:

concentration of NH$_4$OH: 30% w/w

NH$_4$OH addition: 1.8×stoichiometric time of NH$_4$OH addition: 19 minutes precipitation temperature: 25° C.

After completion of the NH$_4$OH addition the primary slurry was transferred into an autoclave, heated to the target temperature of 185° C. and hydrothermally treated at this temperature for 2 hours. The autoclaved magnesium hydroxide was then filtered and washed.

The wet washed filter cake was reslurried in de-ionised water to a strength of 10% solids. The slurry was heated to 60° C. 2.5% w/w (magnesium hydroxide) of stearic acid and the stoichiometric amount of NH$_4$OH (30% w/w) were added. The slurry was left agitated at 60° C. for ½ hour. The stearate coated material was then filtered and dried at 110° C. for 72 hours. The dry coated powder had the following physical characteristics:

BET specific surface area: 1.9 m$^2$/g

Median particle size: 2.7 μm (15 minutes ultrasonics)

Oil absorption (linseed oil): 41 mL/100 g

The stearate coated magnesium hydroxide was compounded in a two-roll mill compounder with ethylene vinyl acetate (EVA) 1020VN5 grade at a loading of 60% w/w. The physical properties determined on samples cut from compression moulded sheets of the compound were as follows:

Tensile strength: 8.2 MPa

Elongation at break: 721% oxygen index: >40% v/v

Figure 3A:
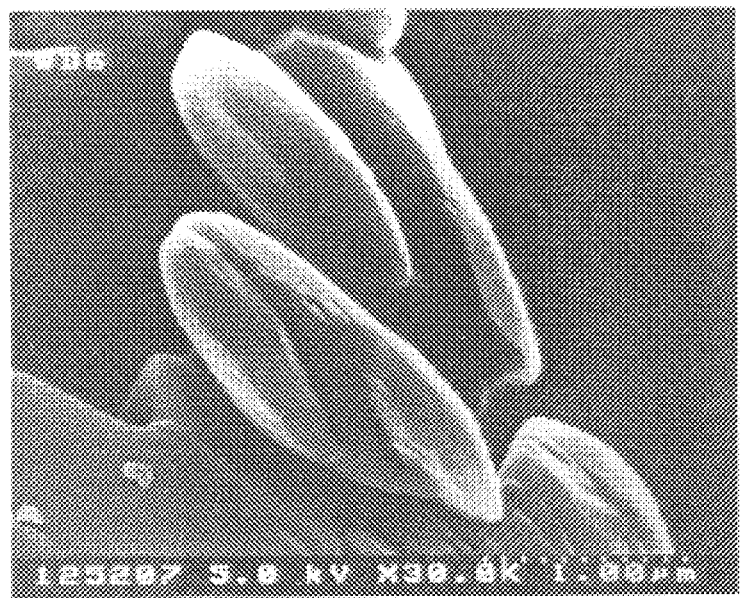
FIGS. 3(a) to 3(c) are scanning electron micrographs showing magnesium hydroxide containing crystals produced according to Example 16.
Figure 3B:
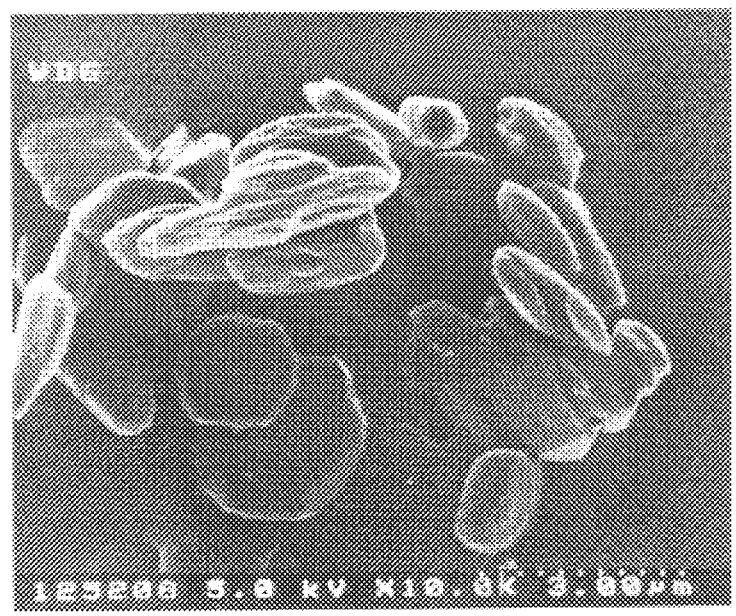
Figure 3C:
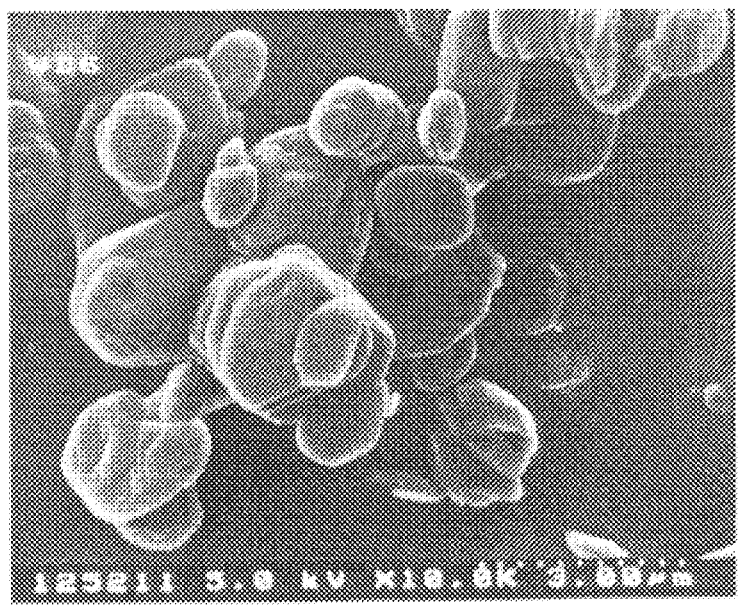
Figure 4A:
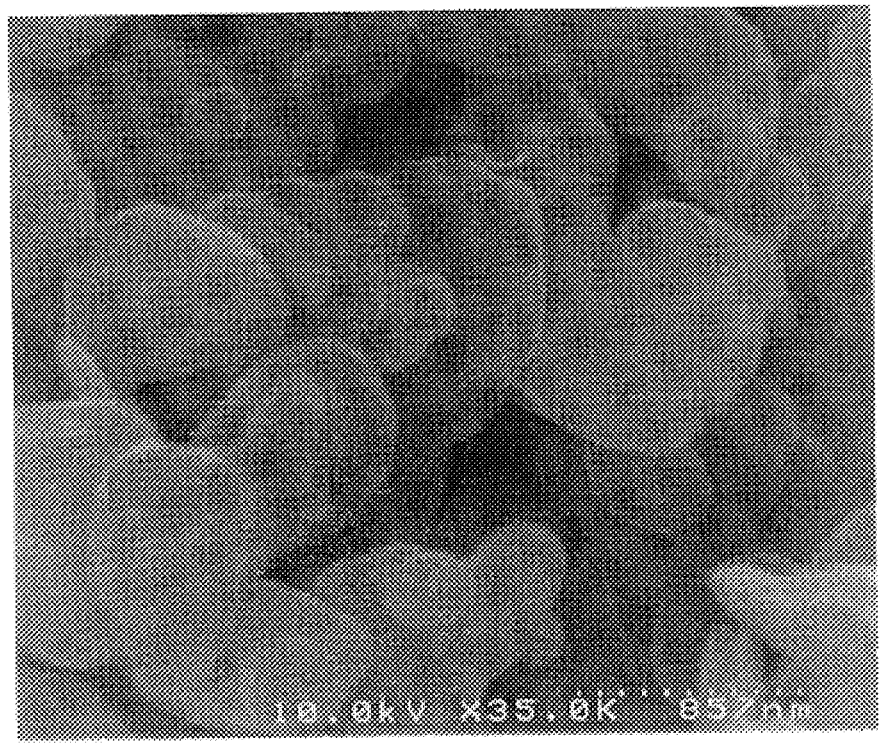
FIGS. 4(a) to 4(d) are scanning electron micrographs showing magnesium hydroxide containing crystals produced according to Example 15 (0.25h).
Figure 4B:
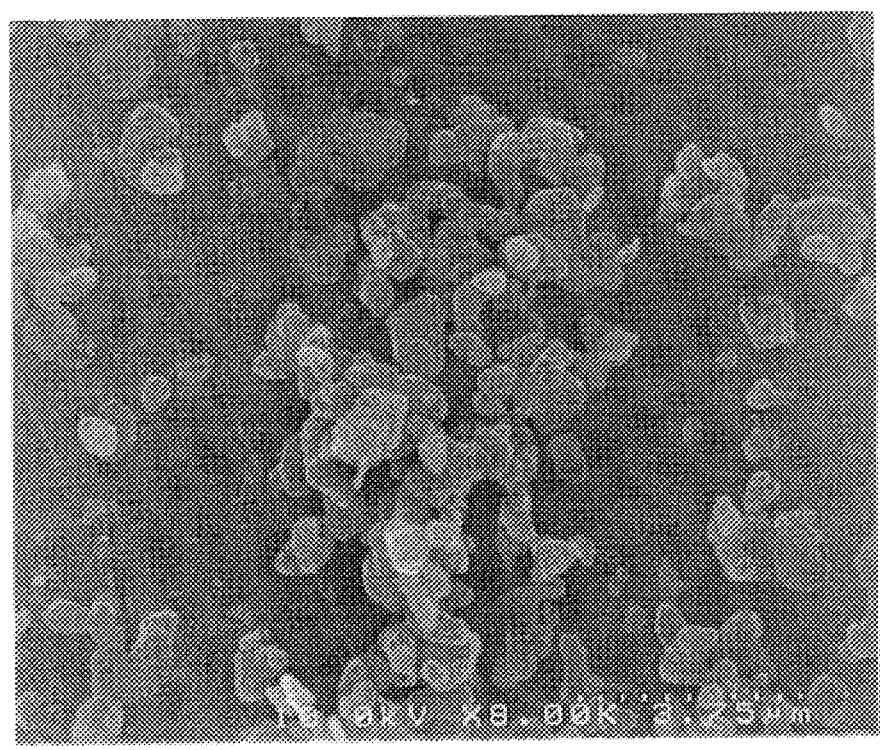
Figure 4C:
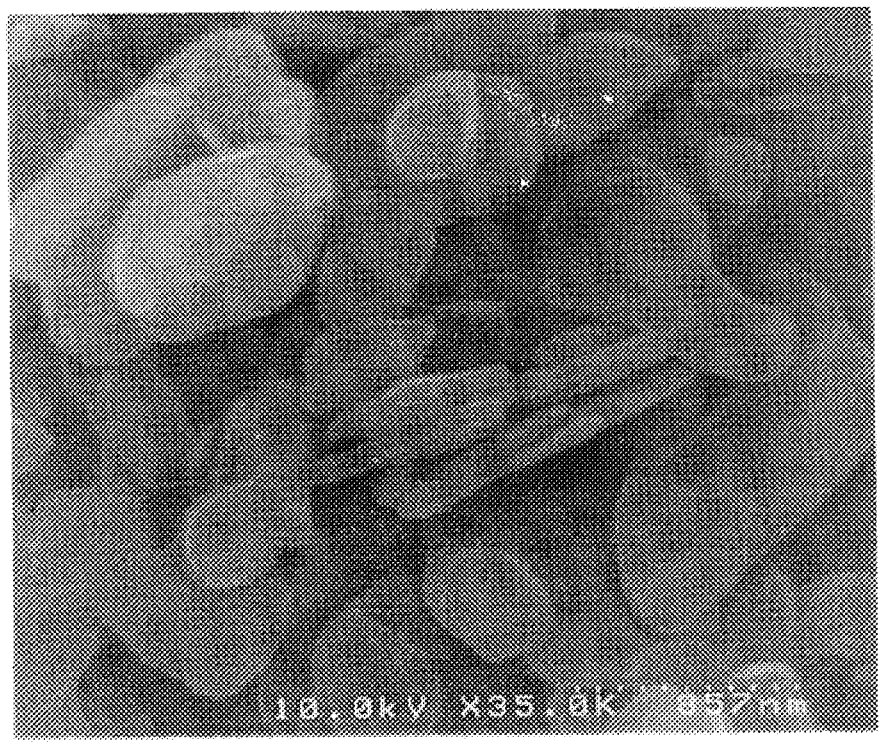
Figure 4D:
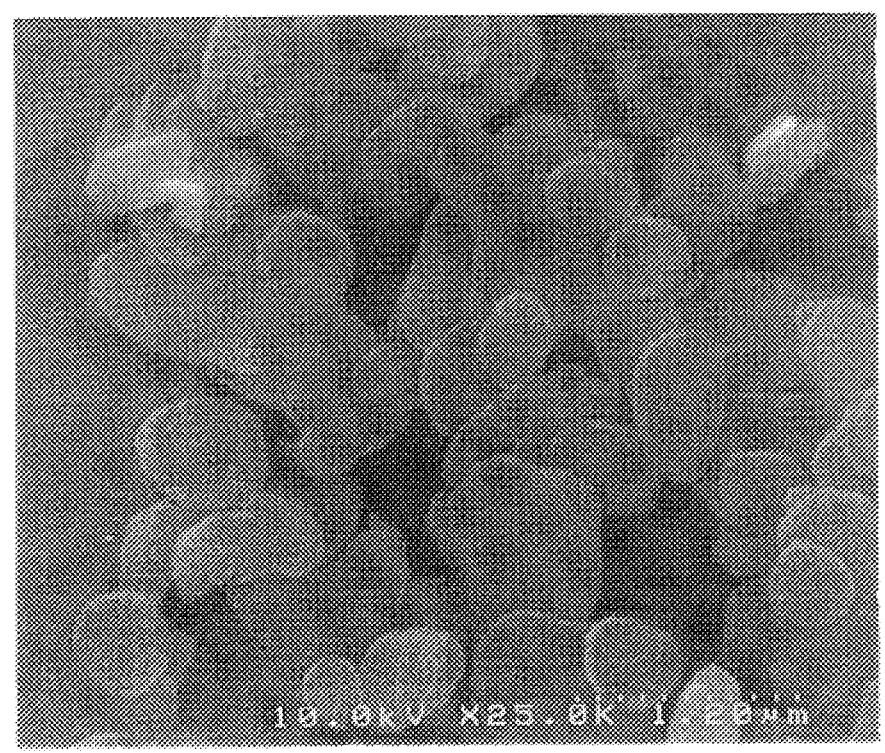
Figure 5A:
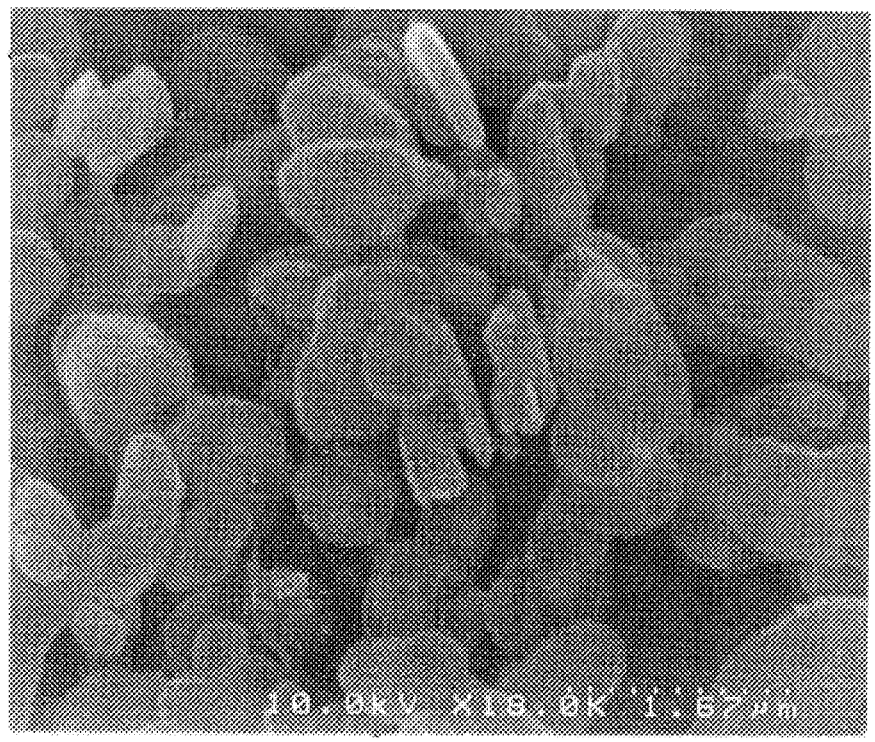
FIGS. 5(a) to 5(d) are scanning electron micrographs showing magnesium hydroxide containing crystals produced according to Example 15 (2h).
Figure 5B:
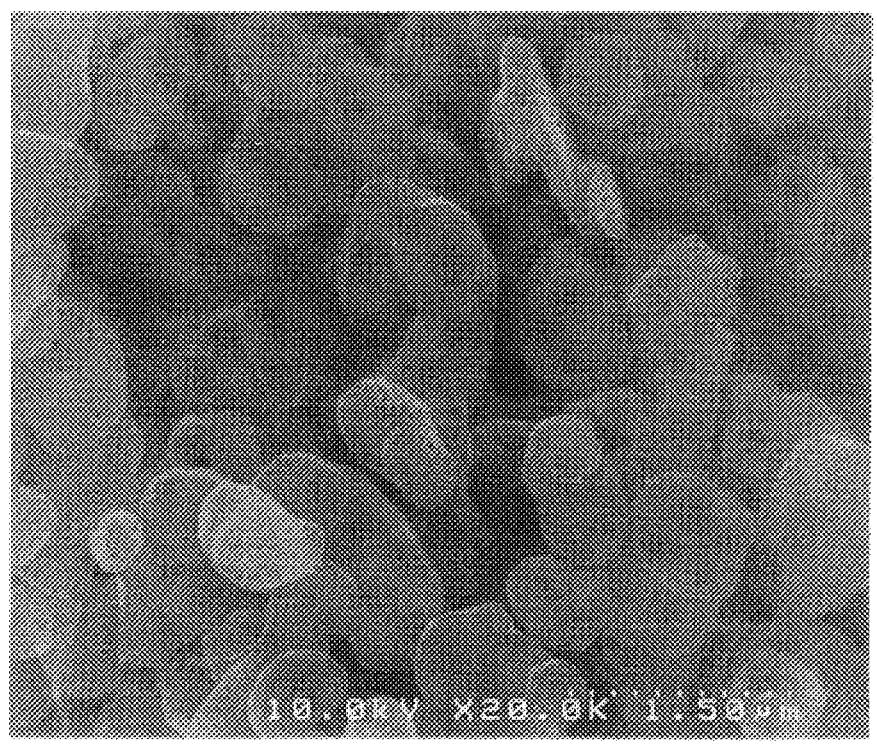
Figure 5C:
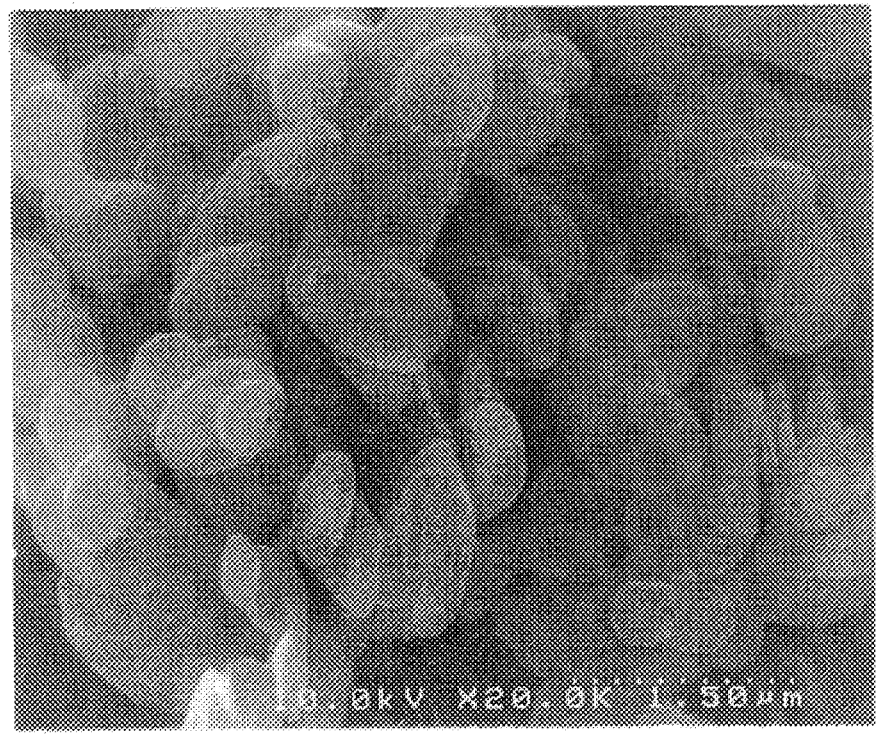
Figure 5D:
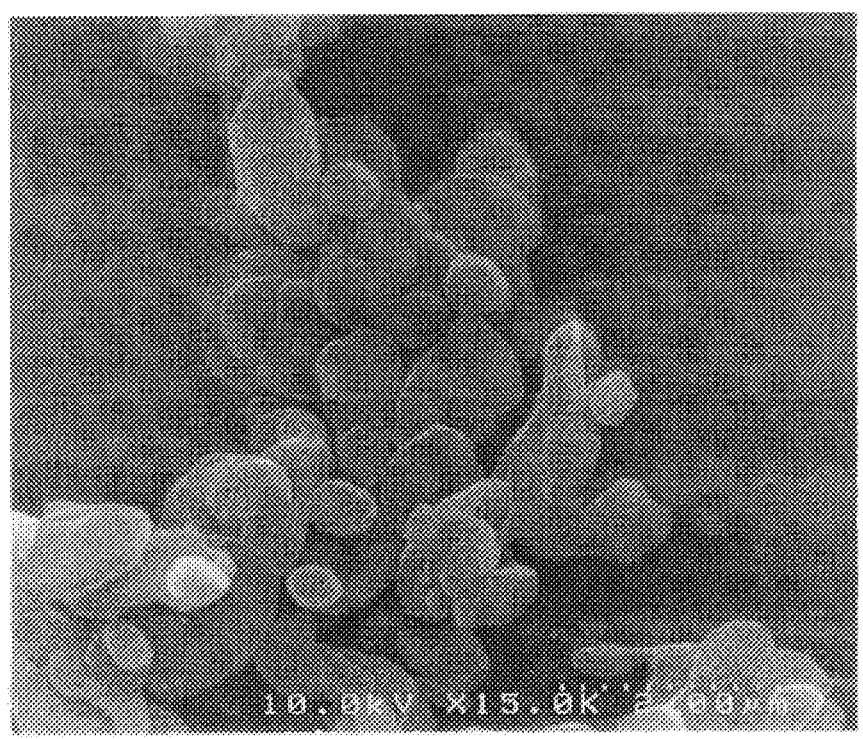

The ovoid magnesium hydroxide crystals produced are shown in FIGS. 3(a) to 3(c).

EXAMPLE 17

Magnesium hydroxide was precipitated from a chloride solution containing 57.2 g/L Mg, 2.2 g/L Ca and less than 1 mg/L each of Fe, Mn and Ni. The precipitation was carried out batchwise in a 500 Liter FRP vessel. Agitation was by 4-blade (pitched) turbine. No heating was applied. The operating conditions were as follows:

concentration of NH$_4$OH: 25% w/w

NH$_4$OH addition: 1.95×stoichiometric time of NH$_4$OH addition: 20 minutes precipitation temperature: 28° C.

After completion of the NH$_4$OH addition the primary slurry was processed continuously in an electrically heated tube reactor with a working volume of 5 Liters (20 m. length tube of ¾" diameter). The reactor temperature was 270° C., the slurry residence in the reactor 13 minutes. The hydrothermally treated magnesium hydroxide was then filtered and washed.

The wet washed filter cake was reslurried in the de-ionised water to a strength of 10% solids. The slurry was heated to 60° C. 2.5% w/w (magnesium hydroxide) of stearic acid and the stoichiometric amount of NH$_4$OH (25% w/w) were added. The slurry was left agitated at 60° C. for ½ hour. The stearate coated material was then filtered and dried at 110° C. for 12 hours. The dry coated powder had the following physical characteristics:

BET specific surface area: 3 m$^2$/g

Median particle size: 1.74 μm (2 minutes ultrasonics)

Oil absorption (linseed oil): 41 mL/100 g

Figure 6A:
FIGS. 6(a) to 6(c) are scanning electron micrographs showing magnesium hydroxide containing crystals produced according to Example 17.
Figure 6B:
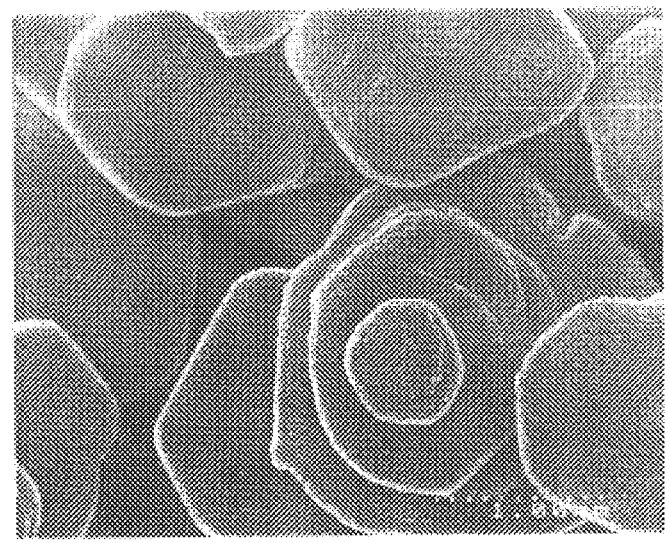
Figure 6C:
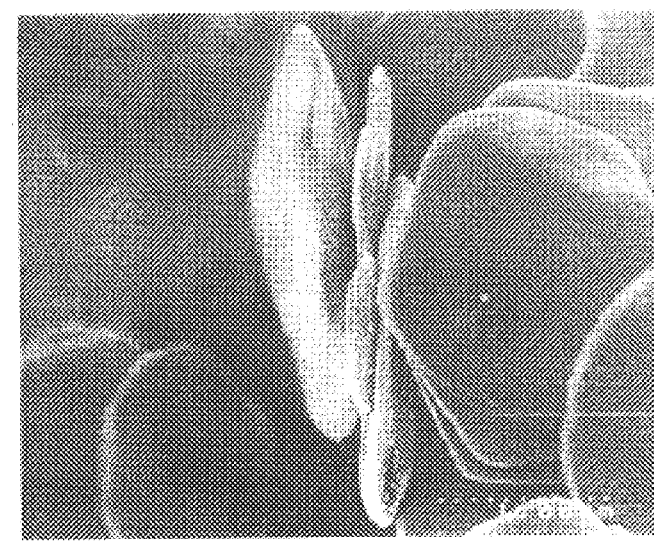

The magnesium hydroxide crystals produced are shown in FIGS. 6(a) to (c).

The stearate coated magnesium hydroxide was compounded in a two-roll mill compounder with ethylene vinyl acetate (EVA) 1020VN5 grade at a loading of 60% w/w. The physical properties determined on samples cut from compression moulded sheets of the compound were as follows:

Tensile strength: 9.5 MPa

Elongation at break: 669%

EXAMPLE 18

Magnesium hydroxide was precipitated batchwise from a chloride solution containing 60 g/L Mg, 2 g/L Ca and less than 1 mg/L each of Fe, Mn and Li. The precipitation was conducted in the equipment described in Example 17. The operating conditions were as follows:

concentration of NH$_4$OH: 25% w/w

NH$_4$OH addition: 1.8×stoichiometric time of NH$_4$OH addition: 15 minutes precipitation temperature: 80° C.

After completion of the NH$_4$OH addition the primary slurry was hydrothermally treated continuously in an electrically heated tube reactor with a working volume of 4 Liters (80 m length tube of ⅜" diameter). The reactor temperature was 250° C., the slurry residence in the reactor 1.6 minutes. The hydrothermally treated product was filtered, washed and then dried at 110° C. for 12 hours. The dry powder had the following characteristics:

BET specific surface area: 5.3 m$^2$/g

Median particle size: 0.78 μm (5 minutes ultrasonics)

Oil absorption (linseed oil): 51 mL/100 g

Figure 7A:
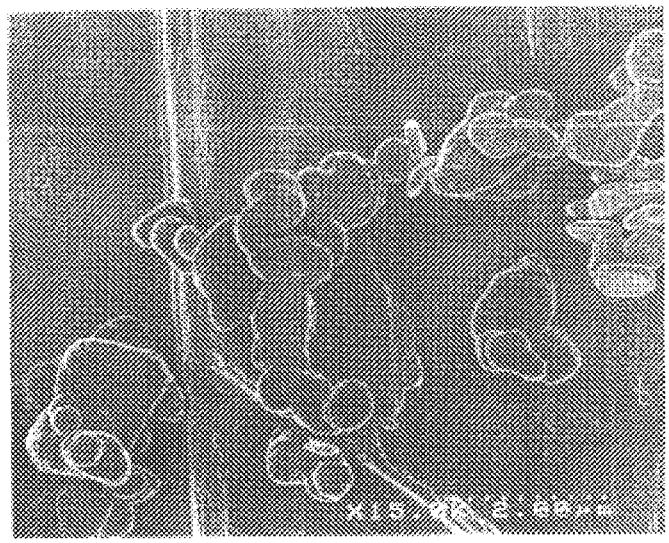
FIGS. 7(a) to 7(c) are scanning electron micrographs showing magnesium hydroxide containing crystals produced according to Example 18.
Figure 7B:
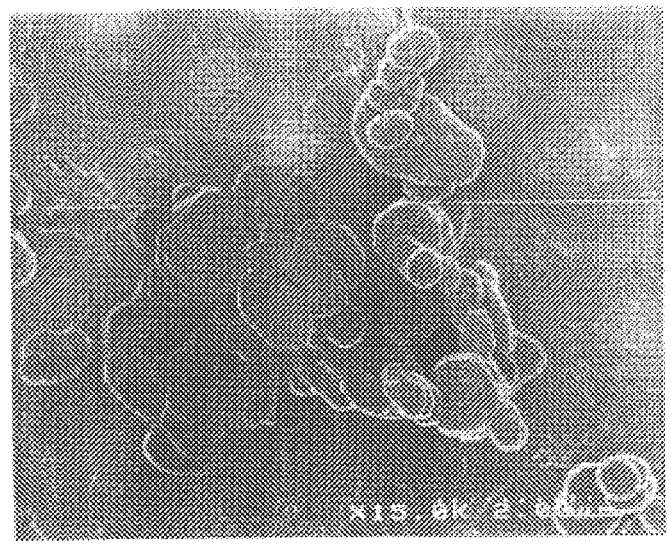
Figure 7C:
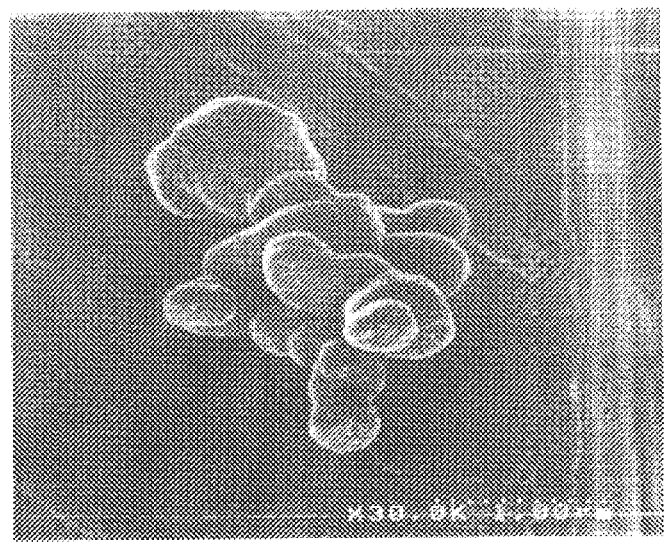
Figure 8A:
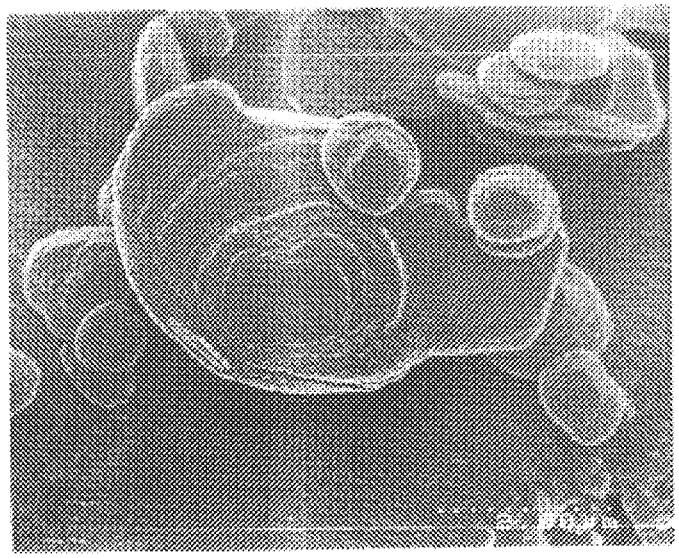
FIGS. 8(a) to 8(d) are scanning electron micrographs showing magnesium hydroxide containing crystals produced according to Example 19, Trial 1.
Figure 8B:
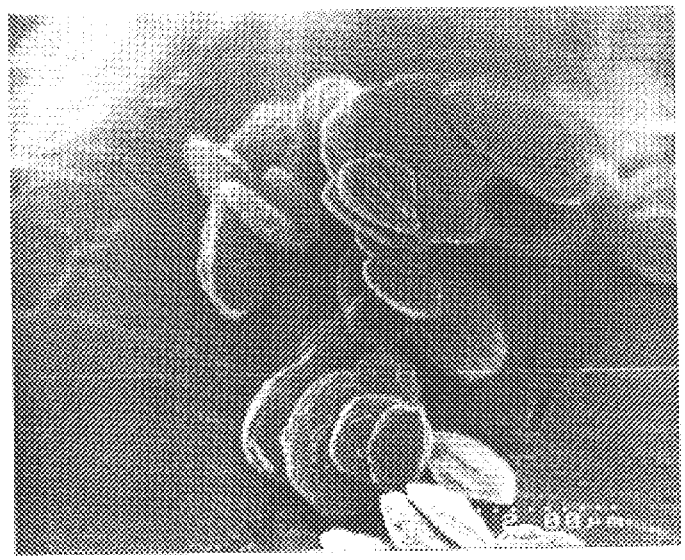
Figure 8C:
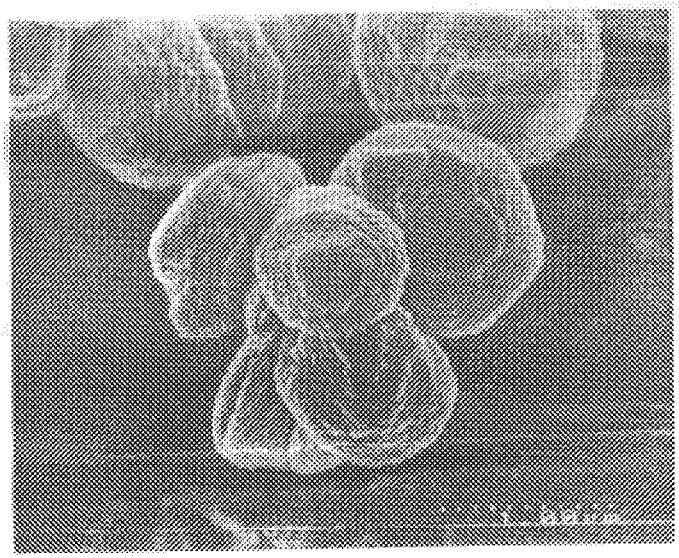
Figure 8D:
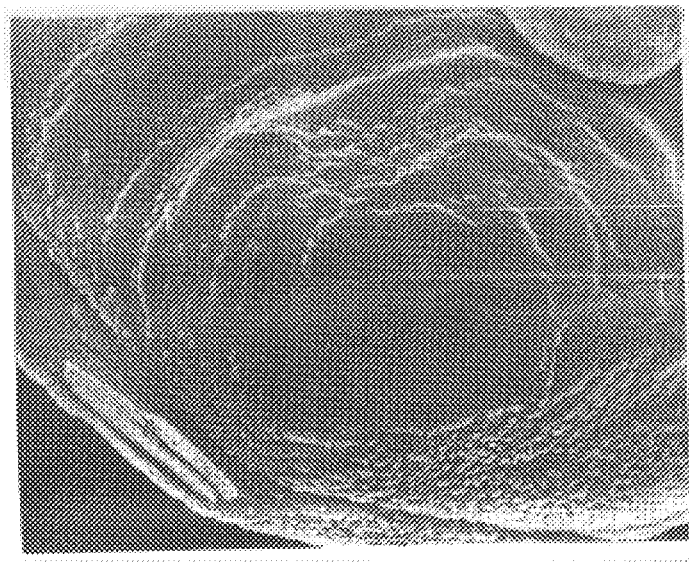

The magnesium hydroxide crystals produced are shown in FIGS. 7(a) to 7(c).

EXAMPLE 19

Magnesium hydroxide was precipitated from a chloride solution containing 60 g/L Mg according to the conditions presented in Example 18. The primary slurries were then hydrothermally treated continuously in a tube reactor with a working volume of either 4 or 9 Liters (tubular reactions in series) under varying conditions. The treated products were filtered, washed and then dried at 110° C. for 12 hours. The physical characteristics of the hydrothermally treated materials together with the hydrothermal conditions are summarised in the table below:

| Trial No. | Reactor Size (L) | Temp. (°C.) | Residence Time (min) | BET Specific Surface Area (m$^2$/g) | Oil Absorption* (mL/100 g) | Median Particle Size** (μm) |
|---|---|---|---|---|---|---|
| 1 | 9 | 255 | 5.4 | 5.1 | 43 | 1.32 |
| 2 | 4 | 258 | 2.4 | 5.0 | 58 | 1.02 |
| 3 | 4 | 265 | 1.6 | 4.7 | 54 | 1.03 |
| 4 | 4 | 242 | 1.2 | 6.9 | 61 | 0.63 |

*linseed oil
**5 minutes ultrasonics

The magnesium hydroxide crystals produced for Trial 1 are shown in FIGS. 8(a) to 8(d).

Figure 9A:
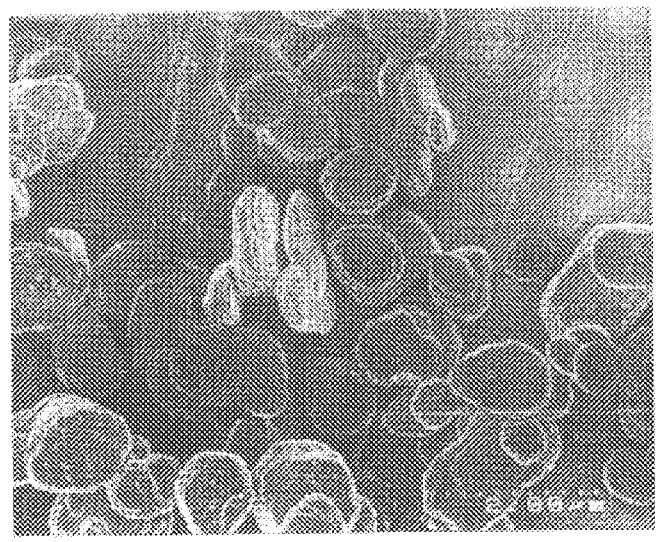
FIGS. 9(a) to 9(c) are scanning electron micrographs showing magnesium hydroxide containing crystals produced according to Example 19, Trial 2.
Figure 9B:
Figure 9C:
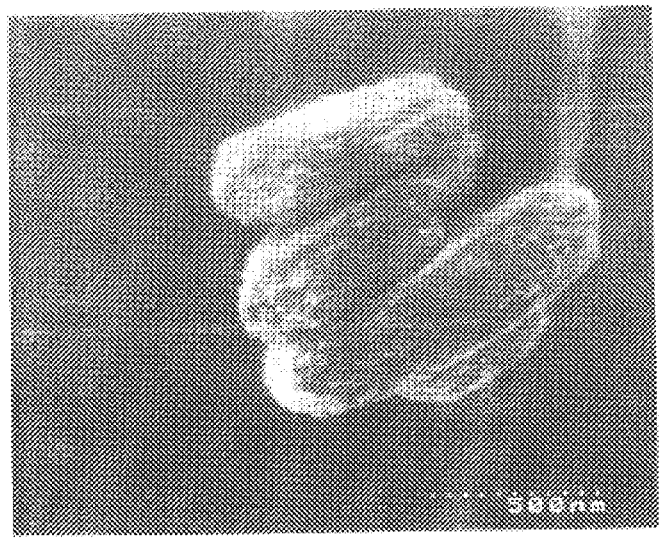

The magnesium hydroxide crystals produced for Trial 2 are shown in FIGS. 9(a) to 9(c).

Figure 10A:
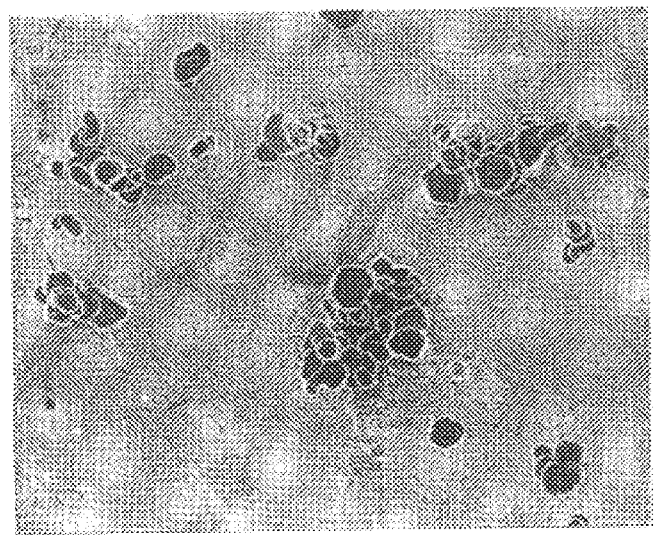
FIGS. 10(a) to 10(c) are scanning electron micrographs showing magnesium hydroxide containing crystals produced according to Example 19, Trial 3.
Figure 10B:
Figure 10C:
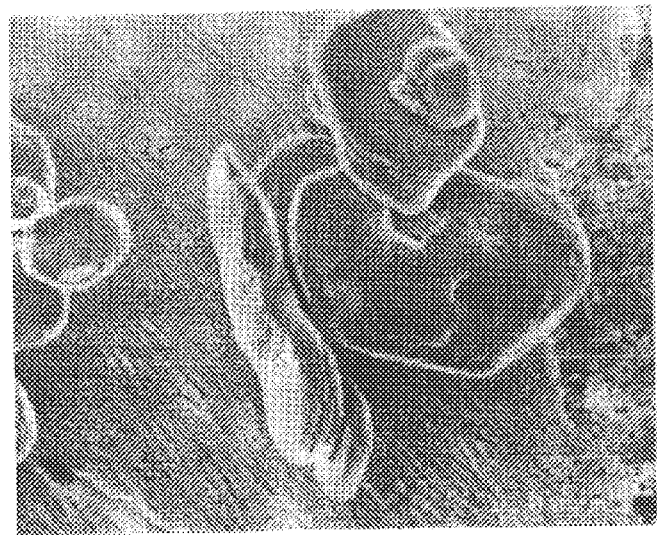

The magnesium hydroxide crystals produced for Trial 3 are shown in FIGS. 10(a) to 10(c).

Figure 11A:
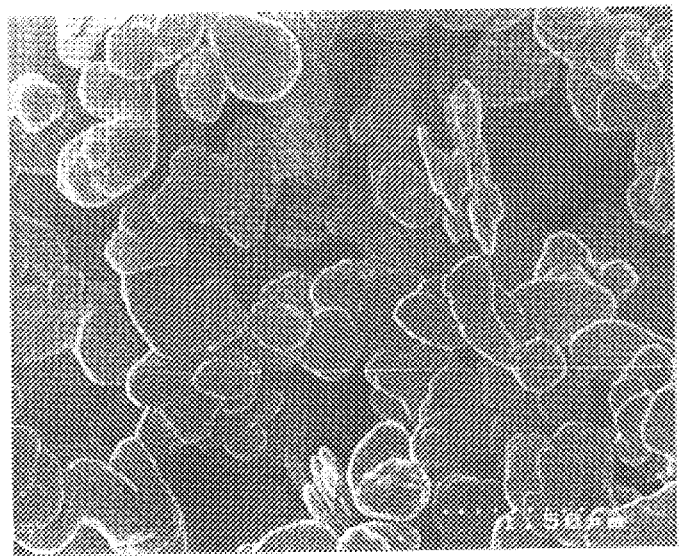
FIGS. 11(a) to 11(b) are scanning electron micrographs showing magnesium hydroxide containing crystals produced according to Example 19, Trial 4.
Figure 11B:
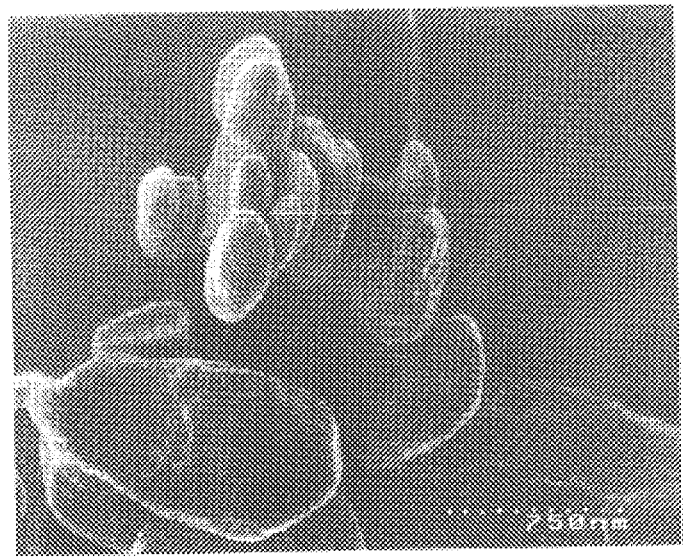

The magnesium hydroxide crystals produced for Trial 4 are shown in FIGS. 11(a) and 11(b).

Finally, it is to be understood that various other modifications and/or alterations may be made without departing from the spirit of the present invention as outlined herein.

We claim:
1. A flame retardant quality magnesium hydroxide having
a BET specific surface area of less than approximately 10 m² per gram (uncoated),
an average particle size of approximately 0.5 to 10.0 micron, and less than approximately 0.5% of particles over 10 micron (average particle size measured by laserlight scattering method), and
a substantial number of crystals which are generally ovoid in cross section.

2. A magnesium hydroxide according to claim 1 having oil absorption less than approximately 70 mL/100 g (oil absorption measured under International Standard ISO 787/5-1980(E)).

3. A magnesium hydroxide according to claim 1 wherein the BET surface area is less than approximately 6 m²/g and the average particle size is approximately 0.5 to 5.0 micron.

4. A coated magnesium hydroxide product including
a flame retardant quality magnesium hydroxide containing crystals being generally ovoid in cross-section, with a low BET specific surface area less than approximately 10 m²/g, a median particle size of approximately 0.5 to 10.0 micron and an oil absorption less than approximately 70 mL/100 g (oil absorption measured under International Standard ISO 787/5-1980(E))
an anionic surface active agent selected from the group consisting of stearic acid, oleic acid, lauric acid, palmitic acid, sodium stearate, potassium behenate, sodium montanate, potassium stearate, sodium oleate, potassium oleate, sodium palmitate, potassium palmitate, sodium laurate, potassium laurate, sodium dilauryl benzenesulfonate, potassium octadecylfsulfate, sodium laurylsulfonate, disodium 2-sulfoethyl α-sulfostearate and ammonium salts of fatty acids, and mixtures thereof coated on the magnesium hydroxide.

5. A polymeric composition including
a thermoplastic polymer, thermoset or elastomer; and
a magnesium hydroxide component containing a substantial number of crystals being generally ovoid in cross section with a low BET specific surface area less than 10 m²/g, a median particle size of approximately 0.5 to 10.0 micron and an oil absorption less than approximately 70 mL/100 g (oil absorption measured under International Standard ISO 787/5-1980(E)).

6. A polymeric composition according to claim 5 wherein the thermoplastic polymer is selected from the group consisting of homo- or co-polymers of styrene, homo- or co-polymers of propylene, homo- or co-polymers of olefins including ethylene, vinyl resins, polyester resins, polycarbonate resins, nylon resins, acetate resins, acetal resins and blends thereof; the thermoset is selected from the group consisting of unsaturated polyester resins, epoxy resins, acrylic resins and blends thereof; and the elastomer is selected from the group consisting of styrene-butadiene rubber (SBR), ethylene-propylene (EP), ethylene-propylene diene monomer (EPDM) and blends thereof.

7. A polymeric composition according to claim 6 wherein the thermoplastic polymer is an ethylene vinyl acetate copolymer, and the polymeric composition exhibits a high elongation at break and a high limiting oxygen index.

8. A process for preparing a flame retardant quality magnesium hydroxide which includes
providing
a magnesium chloride solution; and
a source of ammonia;
adding a stoichiometric excess of ammonia to the solution to form a magnesium hydroxide precipitate; and
subjecting the magnesium hydroxide to a hydrothermal recrystallisation.

9. A process according to claim 8 wherein the magnesium chloride solution contains from approximately 20–130 g/l magnesium.

10. A process according to claim 9 wherein the magnesium chloride solution contains from approximately 40–100 g/l magnesium.

11. A process according to claim 8 wherein the process further includes a preliminary purification step which includes providing
a magnesium chloride solution;
a source of base; and
a source of oxidant;
adding the source of base to the magnesium chloride solution to raise the pH thereof;
treating the magnesium chloride solution with the source of oxidant to oxidise trace impurities therein; and
removing trace impurities as their insoluble hydroxides.

12. A process according to claim 11 wherein the source of base is caustic magnesium oxide and the pH is raised to approximately pH 4–7.

13. A process according to claim 11 wherein the oxidant is chlorine; and
the trace impurities are removed as their insoluble hydroxides by filtration.

14. A process according to claim 8 wherein, in the precipitation step, ammonia is present in the range of approximately 100% to 250% of the stoichiometric amount and the precipitation step is conducted at a temperature of approximately 15° C. and 150° C.

15. A process according to claim 14, wherein the precipitation step is conducted at a temperature of 30° C. to 110° C.

16. A process according to claim 14 wherein the ammonia addition time is from approximately 2 seconds to approximately 2 hours.

17. A process according to claim 16, wherein the ammonia addition time is from approximately 1 minute to 30 minutes.

18. A process according to claim 14, wherein the precipitation step is continuous and ammonia is added continuously.

19. A process according to claim 14 wherein the hydrothermal recrystallisation step is conducted at temperatures of approximately 130° C. to 300 C. or higher and continues for from approximately 6 hours to approximately 30 seconds.

20. A process according to claim 19 wherein the hydrothermal recrystallization is conducted in an autoclave at temperatures of approximately 220° C. to 150° C.

21. A process according to claim 20 wherein the hydrothermal recrystallisation is conducted in a tube reactor at temperatures of approximately 300° C. to 150° C.

22. A process according to claim 21 wherein the temperatures are from approximately 300° C. to 220° C.

23. A process according to claim 19 further including subjecting the magnesium product so formed to a purification step; and subjecting the puritied magnesium hydroxide product to a drying step.

24. A process according to claim 23 wherein the purification step includes filtering the product and washing the filtered cake so formed with water to produce a purified magnesium hudroxide product.

25. A process according to claim 8 including to the preliminary step of providing
a magnesium-coating material; and a source of inorganic acid; and treating the magnesium-containing material with the acid to form magnesium chloride.

26. A process according to claim 25 wherein the inorganic acid is hydrochloric acid.

27. A process according to claim 26 wherein the hydrochloric acid is present in the form of an aqueous solution of approximately 20–35% by weight of hydrochloric acid.

28. A process according to claim 25 wherein magnesium containing material is a magnesite ore or magnesium oxide (MgO) derived from a magnesite ore, or a mixture thereof.

29. A process according to claim 8 including the preliminary step of providing a magnesium oxide-containing material, and ammonium chloride; and leaching the magnesium oxide-containing material with the ammonium chloride to form magnesium chloride.

30. A process according to claim 29 wherein the leaching step is conducted at a temperature of approximately 60° C. to 120° C.

31. A process according to claim 29 wherein at least a portion of the ammonium chloride formed as a by-product is recycled to the leaching step.

32. A flame retardant quality magnesium hydroxide whenever prepared by a process according to claim 8.

* * * * *